Feb. 6, 1945. E. P. DU PONT ET AL 2,368,705
LIQUID LEVEL GAUGE FOR TANKS
Filed Nov. 1, 1943

INVENTORS
STEPHEN DU PONT AND
ELEUTHERE PAUL DU PONT
BY Chapin & Neal
ATTORNEYS

Patented Feb. 6, 1945

2,368,705

UNITED STATES PATENT OFFICE 2,368,705

LIQUID LEVEL GAUGE FOR TANKS

Eleuthere Paul du Pont, Montchanin, Del., and Stephen du Pont, Wilbraham, Mass., assignors to Indian Motocycle Company, Springfield, Mass., a corporation of Massachusetts Application November 1, 1943, Serial No. 508,618

14 Claims. (Cl. 73—323)

The present invention relates to a liquid level indicating gauge for liquid enclosing tanks, and has for its object the provision of simple and effective means for making visibly apparent the relative amount of liquid in the tank.

The present embodiment is more particularly adapted for use with gasoline tanks of motorcycles and for this purpose is mounted in the top wall of said tank in front of the rider whereby the condition of the tank as to its content of gasoline will be readily apparent at all times.

The optical laws governing the operation of the present device are well understood. For instance, the critical angle for total reflection of light at a boundary between glass and air is about 42.5°, and said critical angle for a boundary between glass and liquid such as water or gasoline is about 62.5° whereby light will be reflected from a boundary of glass and air at all angles of incidence between 42.5° and 90°, but from a boundary of glass and liquid the light will not be reflected unless the angle of incidence lies between 62.5° and 90°. This means that a large part of diffused light reflected from glass in contact with air will not be reflected from glass in contact with liquid.

As a consequence, light conducted downwardly through a glass rod terminating at its lower end in oppositely disposed obliquely inclined faces each at an angle of 45° to the vertical, will be largely reflected back upwardly in said rod when its lower end is in contact with air but will be largely refracted into the liquid and absorbed thereby when said lower end of the rod is immersed in liquid. Such a rod extended downwardly into a darkened chamber such as a closed tank of gasoline when exposed to light at its upper end, will appear relatively dark at said upper end when its lower end is immersed in the gasoline and will appear relatively bright from reflected light when its lower end is not immersed in said gasoline and in contact with air only.

The present invention also employs the same principles of light reflection from prismatic or faceted surfaces to provide visible indicia for the upper end of the liquid level indicating rods and for directing beams of light downwardly into said rods from a light source located laterally at the upper end of said rods. The several features of advantage and improvement over prior devices of this character will become apparent in the following more detailed description of a preferred embodiment of the invention taken in connection with the accompanying drawing in which Fig. 1 is a side view of the complete gauge instrument with its mounting means partially in section and shown as mounted in the top wall of a gasoline tank, only part of which appears;

Figure 1:
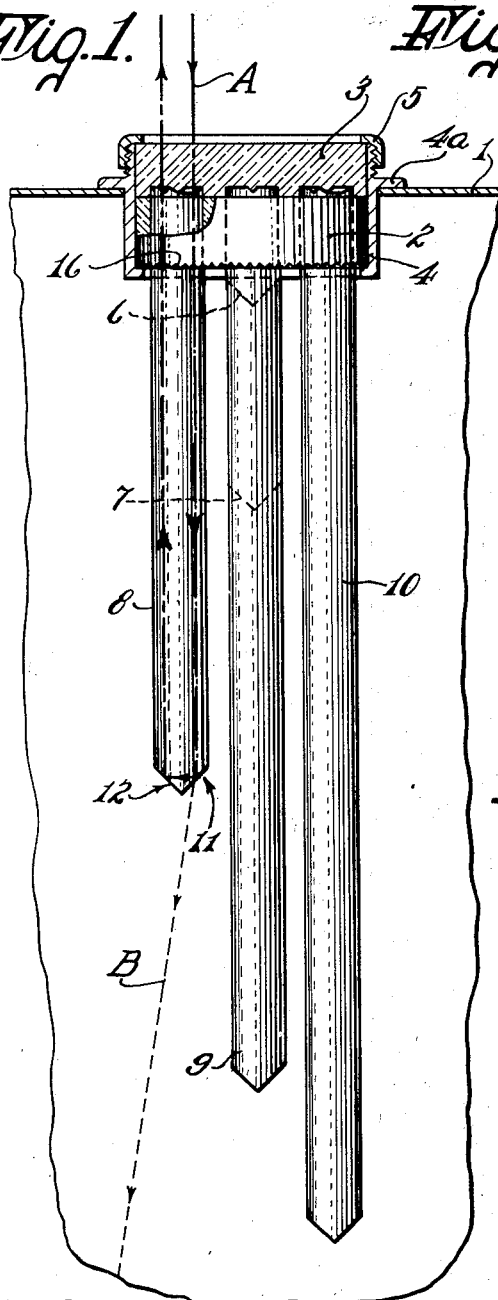
Figure 2:
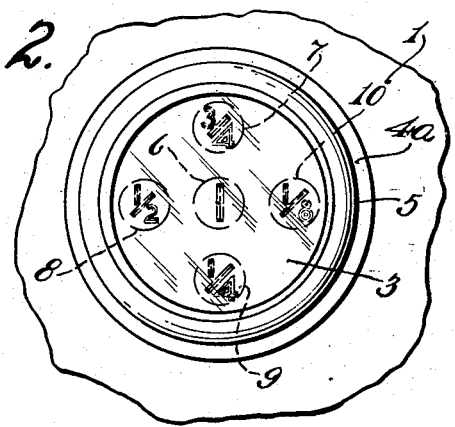
Fig. 2 is a plan view of the same looking down and showing the indicia marks at the top of the several rods.

Referring more particularly to the drawing, the top wall of an enclosed gasoline tank such as currently used on a motorcycle is indicated at 1. The mounting means of the gauge instrument comprise a cylindrical holding block 2 of transparent material such as glass, Lucite, or the like, a cylindrical cover block 3 of similar transparent material superposed on the same all closely fitted and retained together within a casing comprising a cylindrical body 4 and cap member 5 screwed onto the same as shown. The casing body 4 projects through and tightly plugs an opening in the top wall 1 of the tank and is formed with a stop flange 4a resting on said tank wall. The cap member 5 is in the form of an open rim engaging the peripheral edge of the cover block 3 and leaving its upper face exposed for visibility.

Fastened by a close fit in the holding block 2 are a plurality of vertically depending liquid level indicating rods 6, 7, 8, 9, and 10 respectively. While five of such rods are here preferably employed, a greater or less number may be used if desired. As shown, these rods are of different lengths and are mounted with their upper squared off ends flush with the upper surface of the holding block 2. The holding block and its depending rods may be formed as one integral member if desired. The rods terminate at their lower ends at different levels within the gasoline tank 1 and serve to indicate the different heights of liquid in the tank by a relatively bright or dark appearance at their upper ends as will be described. A detailed description of the action of one of these rods will suffice for all.

Referring to rod 8, for instance, it consists of any good transparent material such as glass or Lucite having an index of refraction in the order of that of glass. Its lower end is shaped with oppositely disposed obliquely inclined faces 11 and 12 each at an angle preferably 45° to the vertical. The lower end of the rod may be of conical or pyramidal shape of the same 45° angle of inclination for the same effect. When the lower end of such a rod is not immersed in liquid and light shines on its upper end, a beam such as indicated at A in dotted line passing downwardly in said rod will be completely reflected at the surfaces 11 and 12 in the directions shown and turned back upwardly in said rod with the result that this and other similarly reflected rays will cause the upper end of said rod to appear relatively bright. On the other hand, when the lower end of said rod is immersed in liquid the ray of light A will not be completely reflected at the surface 11 but will be slightly refracted and dispersed into the liquid as indicated by dot-dash line B. Such rays of light refracted into the liquid will be absorbed thereby and consequently the upper end of the rod will appear relatively dark in contrast with its appearance when the rod was free of liquid. In this manner the several rods by a comparison of their appearance will indicate the various conditions of liquid in the tank.

Figure 3:
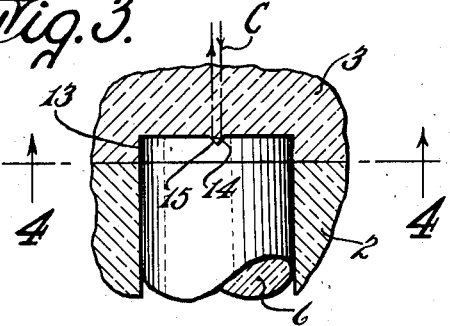
Fig. 3 is an enlarged detail view at the upper end of one of the indicating rods.
Figure 4:
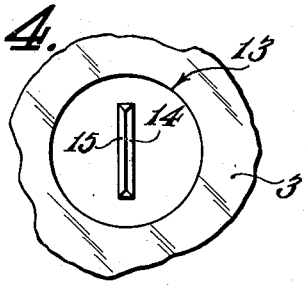
Fig. 4 is a view looking up from the section line 4—4 of Fig. 3.

Appropriate indicia marks are provided for the upper ends of said rods. These markings preferably comprise prismatic projections formed on the lower side of the block 3 and each marking being positioned within a recess such as 13 of said cover block 3 which is in register with the upper end of its respective indicating rod. As shown in Figs. 3 and 4, the indicia marking "1" which corresponds to the upper end of rod 6 is formed by a triangular faceted projection with sides 14 and 15 each inclined at an angle of 45° to the vertical. It will be understood that light shining down through the cover block 3 as indicated by the ray at the dotted line C, Fig. 3, will be totally reflected back upwardly by said surfaces 14 and 15 so as to make the indicia marking "1" thereof clearly visible. Thus when the tank is full the lower end of rod 6 for instance will be immersed in liquid and the upper end of said rod will appear relatively dark. Within this dark area of rod 6, however, will appear in bright visible form the indicia marking "1" because of the light reflected back upwardly from the faces 14 and 15. When the rod 6 is uncovered by liquid its whole top end will appear bright and the indicia marking "1" will not show up by such strong contrast.

In order that the cover block 3 may furnish a bright background for the indicia marks and upper ends of the indicating rods, the lower surface of the holding block 2 is formed with a ribbed faceted surface 16 which will reflect light upwardly from the bottom of said holding block 2.

Figure 6:
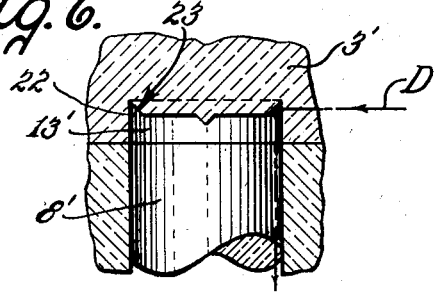
Fig. 6 is an enlarged detail view at the upper end of one of the rods shown in Fig. 5.
Figure 5:
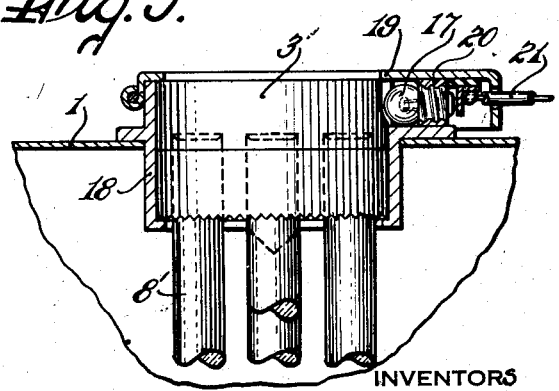
Fig. 5 is a view in section of a slightly modified form of mounting means for the indicating rods.

In Fig. 5 I have shown provision for illuminating the top ends of the several indicating rods by an artificial source of light such as bulb 17 positioned laterally of the upper ends of said rods. The casing for the blocks in this form of the invention is slightly modified from that previously described and comprises a body portion 18 and a hinge cover portion 19 formed with a housing recess at one side for said bulb socket 20. 21 indicates a lead in wire connection for said bulb. In this modification also faceted means are provided for directing rays of light from the bulb 17 downwardly into the several rods. Referring to Fig. 6, the cover block 3' has in its recessed portion 13' a circumferential wedge-shaped cut 22, the side 23 of which is sloped at 45° to the vertical. Thus a ray of light such as D coming laterally into said recess 13 will be deflected downwardly by the faceted surface 23 into the rod 8' for illuminating the same. Such artificial means of illumination are desirable for use of the instrument at night when sunlight is absent.

We claim:

1. An indicating level gauge for liquid enclosing tanks comprising in combination, mounting means in the top wall of said tank, a plurality of rods of transparent material depending vertically from said mounting means having lower ends terminating at different levels in said tanks, the lower end of each rod being formed with oppositely disposed obliquely inclined surfaces at an angle of inclination so related to the refractive index of said rod material as to totally reflect upwardly light passing downwardly in said rods when the lower ends are uncovered by liquid, and to transmit refracted light into liquid when said lower ends are covered by liquid, and distinguishable indicia marks associated with the upper ends of said rods, each indicia mark for its respective rod formed by relatively small prismatic surfaces positioned in conjunction with the upper end of said rod and arranged to reflect light upwardly therefrom.

2. An indicating level gauge for liquid enclosing tanks comprising in combination, a rod holding block having superposed thereon a cover block of transparent material and a retaining casing for said blocks mounted in an opening in the top wall of said tank, a plurality of rods of transparent material depending vertically from said holding block with their lower ends at different levels in said tank, the lower end of each rod being formed with oppositely disposed obliquely inclined surfaces at an angle of inclination approximately 45° to the vertical so as to totally reflect upwardly the light passing downwardly in said rods when the lower ends are uncovered by liquid and to transmit refracted light into liquid when said lower ends are covered by liquid, distinguishable indicia marks associated with the upper ends of said rods, each indicia mark for its respective rod formed by relatively small prismatic surfaces positioned in conjunction with the upper end of said rod and arranged to reflect light upwardly therefrom.

3. An indicating level gauge for liquid enclosing tanks comprising in combination, a rod holding block having superposed thereon a cover block of transparent material and a retaining casing for said blocks mounted in an opening in the top wall of said tank, a plurality of rods of transparent material fixed in said holding block and depending vertically therefrom with their upper ends substantially flush with the upper surface of said holding block and with their lower ends at different levels in said tank, the lower end of each rod being formed with oppositely disposed obliquely inclined surfaces at an angle of inclination approximately 45° to the vertical so as to totally reflect upwardly the light passing downwardly in said rods when the lower ends are uncovered by liquid, and to transmit refracted light into liquid when said lower ends are covered by liquid, distinguishable indicia marks associated with the upper ends of said rods, each indicia mark for its respective rod comprising relatively small prismatic surfaces formed in a recess on the underside of said cover block, positioned in conjunction with the upper end of said rod and arranged to reflect light upwardly therefrom.

4. An indicating level gauge for liquid enclosing tanks comprising in combination, mounting means in the top wall of said tank, a plurality of rods of transparent material depending vertically from said mounting means having lower ends terminating at different levels in said tank, the lower end of each rod being formed with oppositely disposed obliquely inclined surfaces at an angle of inclination approximately 45° to the vertical so as to totally reflect upwardly light passing downwardly in said rods when the lower ends are uncovered by liquid, and to transmit refracted light into liquid when said lower ends are covered by liquid, an electric bulb positioned at one side of said mounting means and arranged to shine light laterally across the upper ends of said rods, and prismatic light reflecting surfaces arranged in said mounting means to reflect light from said bulb downwardly in said rods.

5. An indicating level gauge for liquid enclosing tanks comprising in combination, a rod holding block of transparent material having superposed thereon a cover block of transparent material, said holding block having a lower horizontally disposed surface ridged throughout its area with relatively small prismatic surfaces arranged at an angle to reflect light upwardly through said block, and a retaining casing for said blocks mounted in an opening in the top wall of said tank, a plurality of rods of transparent material depending vertically from said holding block with their lower ends terminating at different levels in said tank, the lower end of each rod being formed with oppositely disposed obliquely inclined surfaces at an angle of inclination approximately 45° to the vertical so as to totally reflect upwardly light passing downwardly in said rods when the lower ends are uncovered by liquid, and to transmit refracted light into liquid when said lower ends are covered by liquid.

6. An indicating level gauge for liquid enclosing tanks comprising in combination, a rod holding block of transparent material having superposed thereon a cover block of transparent material, said holding block having a lower horizontally disposed surface ridged throughout its area with relatively small prismatic surfaces arranged at an angle to reflect light upwardly through said block, and a retaining casing for said blocks mounted in an opening in the top wall of said tank, a plurality of rods of transparent material depending vertically from said holding block with their lower ends at different levels in said tank, the lower end of each rod being formed with oppositely disposed obliquely inclined surfaces at an angle of inclination approximately 45° to the vertical so as to totally reflect upwardly light passing downwardly in said rods when the lower ends are uncovered by liquid, and to transmit refracted light into liquid when said lower ends are covered by liquid, distinguishable indicia marks associated with the upper ends of said rods, each indicia mark for its respective rod formed by relatively small prismatic surfaces positioned in conjunction with the upper ends of said rod and arranged to reflect light upwardly therefrom.

7. An indicating level gauge for liquid enclosing tanks comprising in combination, a rod holding block of transparent material having superposed thereon a cover block of transparent material, said holding block having a lower horizontally disposed surface ridged throughout its area with relatively small prismatic surfaces arranged at an angle to reflect light upwardly through said block, and a retaining casing for said blocks mounted in an opening in the top wall of said tank, a plurality of rods of transparent material depending vertically from said holding block with their lower ends at different levels in said tank, the lower end of each rod being formed with oppositely disposed obliquely inclined surfaces at an angle of inclination approximately 45° to the vertical so as to totally reflect upwardly the light passing downwardly in said rods when the lower ends are uncovered by liquid, and to transmit refracted light into liquid when said lower ends are covered by liquid, distinguishable indicia marks associated with the upper ends of said rods, each indicia mark for its respective rod comprising relatively small prismatic surfaces formed in a recess on the underside of said cover block, positioned in conjunction with the upper end of said rod and arranged to reflect light upwardly therefrom.

8. An indicating level gauge for liquid enclosing tanks comprising in combination, mounting means in the top wall of said tank, a plurality of rods of transparent material depending vertically from said mounting means having lower ends terminating at different levels in said tanks, the lower end of each rod being formed with oppositely disposed obliquely inclined surfaces at an angle of inclination so related to the refractive index of said rod material as to totally reflect upwardly light passing downwardly in said rods when the lower ends are uncovered by liquid, and to transmit refracted light into liquid when said lower ends are covered by liquid, and the upper ends of said rods each having associated therewith an individual indicia number formed by prismatic surfaces which reflect light upwardly.

9. An indicating level gauge for liquid enclosing tanks comprising in combination, a rod holding block having superposed thereon a cover block of transparent material and a retaining casing for said blocks mounted in an opening in the top wall of said tank, a plurality of rods of transparent material depending vertically from said holding block with their lower ends at different levels in said tank, the lower end of each rod being formed to totally reflect upwardly the light passing downwardly in said rods when the lower ends are uncovered by liquid and to transmit refracted light into liquid when said lower ends are covered by liquid, distinguishable indicia marks associated with the upper ends of said rods, each indicia mark for its respective rod formed by relatively small prismatic surfaces positioned in conjunction with the upper end of said rod and arranged to reflect light upwardly therefrom.

10. An indicating level gauge for liquid enclosing tanks comprising in combination, a rod holding block having superposed thereon a cover block of transparent material and a retaining casing for said blocks mounted in an opening in the top wall of said tank, a plurality of rods of transparent material fixed in said holding block and depending vertically therefrom with their upper ends substantially flush with the upper surface of said holding block and with their lower ends at different levels in said tank, the lower end of each rod being formed to totally reflect upwardly the light passing downwardly in said rods when the lower ends are uncovered by liquid, and to transmit refracted light into liquid when said lower ends are covered by liquid, distinguishable indicia marks associated with the upper ends of said rods, each indicia mark for its respective rod comprising relatively small prismatic surfaces formed in a recess on the underside of said cover block, positioned in conjunction with the upper end of said rod and arranged to reflect light upwardly therefrom.

11. An indicating level gauge for liquid enclosing tanks comprising in combination, mounting means in the top wall of said tank, a plurality of rods of transparent material depending vertically from said mounting means having lower ends terminating at different levels in said tank, the lower end of each rod being formed to totally reflect upwardly light passing downwardly in said rods when the lower ends are uncovered by liquid, and to transmit refracted light into liquid when said lower ends are covered by liquid, an electric bulb positioned at one side of said mounting means and arranged to shine light laterally across the upper ends of said rods, and prismatic light reflecting surfaces arranged in said mounting means to reflect light from said bulb downwardly in said rods.

12. An indicating level gauge for liquid enclosing tanks comprising in combination, a rod holding block of transparent material having superposed thereon a cover block of transparent material, said holding block having a lower horizontally disposed surface ridged throughout its area with relatively small prismatic surfaces arranged at an angle to reflect light upwardly through said block, and a retaining casing for said blocks mounted in an opening in the top wall of said tank, a plurality of rods of transparent material depending vertically from said holding block with their lower ends terminating at different levels in said tank, the lower end of each rod being formed to totally reflect upwardly light passing downwardly in said rods when the lower ends are uncovered by liquid, and to transmit refracted light into liquid when said lower ends are covered by liquid.

13. An indicating level gauge for liquid enclosing tanks comprising in combination, a rod holding block of transparent material having superposed thereon a cover block of transparent material, said holding block having a lower horizontally disposed surface ridged throughout its area with relatively small prismatic surfaces arranged at an angle to reflect light upwardly through said block, and a retaining casing for said blocks mounted in an opening in the top wall of said tank, a plurality of rods of transparent material depending vertically from said holding block with their lower ends at different levels in said tank, the lower end of each rod being formed to totally reflect upwardly light passing downwardly in said rods when the lower ends are uncovered by liquid, and to transmit refracted light into liquid when said lower ends are covered by liquid, distinguishable indicia marks associated with the upper ends of said rods, each indicia mark for its respective rod formed by relatively small prismatic surfaces positioned in conjunction with the upper ends of said rod and arranged to reflect light upwardly therefrom.

14. An indicating level gauge for liquid enclosing tanks comprising in combination, a rod holding block of transparent material having superposed thereon a cover block of transparent material, said holding block having a lower horizontally disposed surface ridged throughout its area with relatively small prismatic surfaces arranged at an angle to reflect light upwardly through said block, and a retaining casing for said blocks mounted in an opening in the top wall of said tank, a plurality of rods of transparent material depending vertically from said holding block with their lower ends at different levels in said tank, the lower end of each rod being formed to totally reflect upwardly the light passing downwardly in said rods when the lower ends are uncovered by liquid, and to transmit refracted light into liquid when said lower ends are covered by liquid, distinguishable indicia marks associated with the upper ends of said rods, each indicia mark for its respective rod comprising relatively small prismatic surfaces formed in a recess on the underside of said cover block, positioned in conjunction with the upper end of said rod and arranged to reflect light upwardly therefrom.

ELEUTHERE PAUL DU PONT.
STEPHEN DU PONT.